US012701198B2

(12) United States Patent
Fisher-Stawinski et al.

(10) Patent No.: US 12,701,198 B2
(45) Date of Patent: Aug. 4, 2026

(54) GESTURE-CONTROLLED PRIVATE TRANSMISSION IN MEETINGS

(71) Applicant: INTERNATIONAL BUSINESS MACHINES CORPORATION, Armonk, NY (US)

(72) Inventors: Steven Lee Fisher-Stawinski, Buffalo Grove, IL (US); Moitreyee Mukherjee-Roy, San Jose, CA (US); Shikhar Kwatra, San Jose, CA (US); Scott E. Schneider, Rolesville, NC (US)

(73) Assignee: Internationaol Business Machines Corporation, Armonk, NY (US)

( * ) Notice: Subject to any disclaimer, the term of this patent is extended or adjusted under 35 U.S.C. 154(b) by 258 days.

(21) Appl. No.: 17/931,589

(22) Filed: Sep. 13, 2022

(65) Prior Publication Data

US 2024/0089407 A1    Mar. 14, 2024

(51) Int. Cl.
*H04L 65/403* (2022.01)
*G06F 3/01* (2006.01)
(Continued)

(52) U.S. Cl.
CPC ............. *H04N 7/152* (2013.01); *G06F 3/013* (2013.01); *G06F 3/017* (2013.01); *G06V 40/28* (2022.01);
(Continued)

(58) Field of Classification Search
None
See application file for complete search history.

(56) References Cited

U.S. PATENT DOCUMENTS 7,656,824 B2    2/2010  Wang
8,654,953 B2    2/2014  Boss
(Continued)

FOREIGN PATENT DOCUMENTS

EP        3282669 B1      1/2020

OTHER PUBLICATIONS

Rogers et al., "BubbleVideo: Supporting Small Group Interactions in Online Conferences." Human-Computer Interaction—INTERACT 2021—18th IFIP TC 13 International Conference, Proceedings, Aug. 26, 2021, DOI: 10.1007/978-3-030-85616-8_5, 11 pages.

(Continued)

*Primary Examiner* — Quoc D Tran
(74) *Attorney, Agent, or Firm* — Michael O'Keefe

(57) ABSTRACT

According to one embodiment, a method, computer system, and computer program product for gesture-controlled private messaging is provided. The embodiment may include establishing a virtual conference room and connections thereto by at least an initiating participant, a recipient participant, and a non-recipient participant. The embodiment may also include detecting a gesture by the initiating participant indicating at least a private communication. The embodiment may further include determining the recipient participant of the private communication. The embodiment may also include altering a user interface of the virtual conference room, of the initiating participant and the recipient participant, to display an indication of the private communication. The embodiment may further include transmitting a message from the initiating participant to the recipient participant.

17 Claims, 4 Drawing Sheets

(51) Int. Cl.

| | | |
|---|---|---|
| *G06V 40/20* | (2022.01) | |
| *H04L 12/18* | (2006.01) | |
| *H04L 51/04* | (2022.01) | |
| *H04N 7/14* | (2006.01) | |
| *H04N 7/15* | (2006.01) | |

(52) U.S. Cl.

CPC .......... *H04L 12/1818* (2013.01); *H04L 51/04* (2013.01); *H04L 65/403* (2013.01); *H04N 7/147* (2013.01); *H04N 7/15* (2013.01); *H04N 7/157* (2013.01)

(56) References Cited

U.S. PATENT DOCUMENTS

| | | | |
|---|---|---|---|
| 9,270,943 | B2 | 2/2016 | Ehmann |
| 10,511,833 | B2 | 12/2019 | Valdivia |
| 10,572,005 | B2 * | 2/2020 | Zahn ..................... G06F 1/1698 |
| 11,140,360 | B1 | 10/2021 | Kasaba |
| 11,184,362 | B1 | 11/2021 | Krol |
| 11,812,194 | B1 * | 11/2023 | Vandyke ................. G06F 3/167 |
| 12,088,646 | B1 * | 9/2024 | Libin .................... H04L 65/403 |
| 2009/0303984 | A1 | 12/2009 | Clark |
| 2011/0279629 | A1 | 11/2011 | Khot |
| 2012/0204118 | A1 | 8/2012 | Lefar |
| 2013/0120522 | A1 * | 5/2013 | Lian ......................... H04N 7/15 |
| | | | 348/E7.083 |
| 2015/0091891 | A1 | 4/2015 | Raheman |
| 2018/0048683 | A1 * | 2/2018 | Katekar ............... H04L 65/403 |
| 2021/0011682 | A1 | 1/2021 | Vennström |
| 2021/0014457 | A1 | 1/2021 | Sugihara |
| 2022/0191259 | A1 * | 6/2022 | Leppänen ............. G06F 3/0484 |
| 2023/0282224 | A1 * | 9/2023 | Chun .................. G10L 21/0232 |
| | | | 381/56 |
| 2024/0028110 | A1 * | 1/2024 | Aurongzeb ........... G06F 3/0481 |

OTHER PUBLICATIONS

Shiomi et al., "Could I Have a Word?: Effects of Robot's Whisper," The 2010 IEEE/RSJ International Conference on Intelligent Robots and Systems, Oct. 18-22, 2010, http://vigir.missouri.edu/~gdesouza/Research/Conference_CDs/IEEE_IROS_2010/data/papers/1034.pdf, pp. 3899-3904.

Sun, "VEI—An Intelligent Web Collaboration System for Virtual Engineering," Massachusetts Institute of Technology, Jun. 2001, 64 pages.

* cited by examiner

100

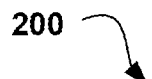

200

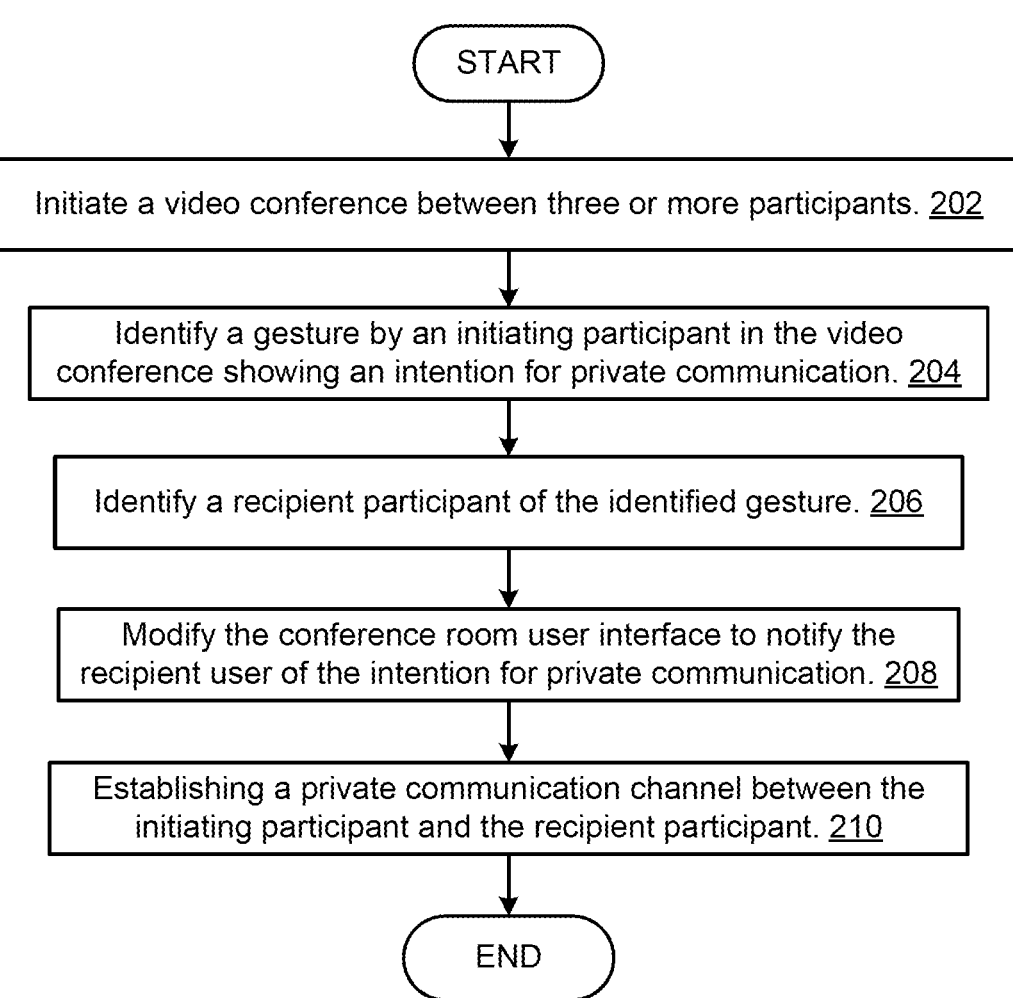

START

Initiate a video conference between three or more participants. 202

Identify a gesture by an initiating participant in the video conference showing an intention for private communication. 204

Identify a recipient participant of the identified gesture. 206

Modify the conference room user interface to notify the recipient user of the intention for private communication. 208

Establishing a private communication channel between the initiating participant and the recipient participant. 210

END

FIG. 2

GESTURE-CONTROLLED PRIVATE TRANSMISSION IN MEETINGS

BACKGROUND

The present invention relates generally to the field of computing, and more particularly to web conferencing.

Web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

SUMMARY

According to one embodiment, a method, computer system, and computer program product for gesture-controlled private messaging is provided. The embodiment may include establishing a virtual conference room and connections thereto by at least an initiating participant, a recipient participant, and a non-recipient participant. The embodiment may also include detecting a gesture by the initiating participant indicating at least a private communication. The embodiment may further include determining the recipient participant of the private communication. The embodiment may also include altering a user interface of the virtual conference room, of the initiating participant and the recipient participant, to display an indication of the private communication. The embodiment may further include transmitting a message from the initiating participant to the recipient participant.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 illustrates an operational flowchart for a gesture-controlled private messaging process according to at least one embodiment.

DETAILED DESCRIPTION

Figure 1:
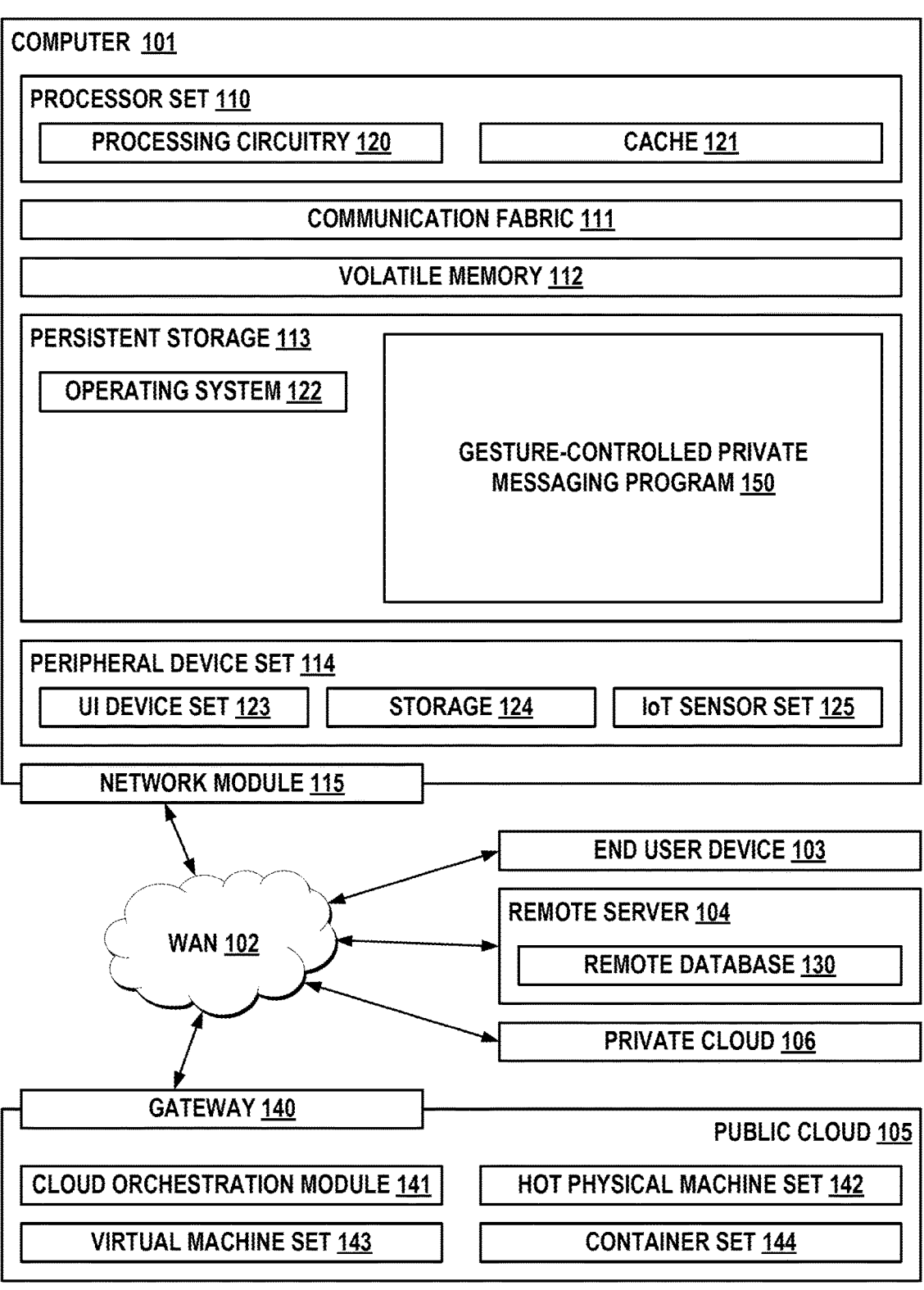
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to web conferencing. The following described exemplary embodiments provide a system, method, and program product to, among other things, utilize gesture recognition to initiate private communication during a web conference. Therefore, the present embodiment has the capacity to improve the technical field of web conferencing by implementing gesture recognition, a form of image recognition, to identify situations where one conference participant wishes to initiate a private communication with another conference participant.

As previously described, web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

In the ever-growing field of online conferencing, or web conferencing, users have become familiar with an increasing suite of features, such as emojis, hand-raising, waiting rooms, breakout sessions, and private communication channels. However, gesture recognition is an emerging feature that has not been fully utilized in the web conferencing space to trigger the performance of other features or actions. As such, it may be advantageous to, among other things, utilize a gesture recognition to identify one participant's desire to initiate a private communication with one or more other participants and, upon proper identification of the participant's desire for private communication, generate a private communication space and invite the appropriate participants.

According to one embodiment, a combination of gesture recognition with participant-to-participant communication is provided. During the course of a web conference, a gesture for private communication, such as the canonical hand-over-mouth, or hand-covering-mouth, whispering gesture, may be identified as being performed by a participant wishing to communicate with another participant as opposed to general communication to all participants. Following the gesture, a private communication, such as a test, speech video, text generated from speech or other material (e.g., a file or link), may be generated and addressed to one or more selected participants that are subset of the entire group of participants in the web conference excluding the speaker. Multiple selection options may be available for selecting the recipients of the private communication. Furthermore, the private communication may be delivered to the selected recipients only, with no or minimal indication given to the non-recipient participants.

In one or more additional embodiments, an feedback step may be performed where the speaker or the private communication receives an indication, including but not limited to a visual, auditory, and/or haptic indications, of any or all private communication gestures recognized, which recipient(s) have been selected to receive the private communication, and/or a prompt to begin speaking or typing the private communication.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as gesture-controlled private messaging program 150. In addition to gesture-controlled private messaging program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and gesture-controlled private messaging program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in gesture-controlled private messaging program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in gesture-controlled private messaging program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the gesture-controlled private messaging program 150 may utilize hardware computing technology the same as, or substantially similar to, that described with respect to computer 101. Furthermore, the gesture-controlled private messaging program 150 may utilize one or more sensors, such as IoT sensor set 125, in conjunction with the hardware computing technology. In addition to the examples previously described, IoT sensor set 125 may further include, but is not limited to, headsets, cameras, wearable sensors, microphones, biometric devices, and haptic/touch feedback devices. The hardware computing technology may include, but is not limited to, a display monitor and a gesture-enabled webcam, which may be integrated into the display monitor. Furthermore, in at least one embodiment, motion or position-sensing hardware may be integrated into a headset or monitoring device, or separately worn by a user, in lieu of camera-based gesture recognition technology.

The gesture-controlled private messaging program 150 may sense user gestures using a communicatively coupled camera and/or wearable sensor. The gesture-controlled private messaging program 150 may identify a specific gesture and/or gaze direction to determine an intent to initiate a private communication as well as the intended recipient(s) of the private communication. In one or more embodiments, the gesture-controlled private messaging program 150 may detect the gesture and the gaze consecutively or contemporaneously. Alternatively, the gesture-controlled private messaging program 150 may allow identification of recipients of private communications through a mouse pointer focus, click, or tap as an indication of intent to initiate private communication.

Furthermore, notwithstanding depiction in computer 101, the contextual accessway opening program 150 may be stored in and/or executed by, individually or in any combination, end user device 103, remote server 104, public cloud 105, and private cloud 106. The contextual accessway opening method is explained in more detail below with respect to FIG. 2 and FIG. 3.

Referring now to FIG. 2, an operational flowchart for a gesture-controlled private messaging process 200 is depicted according to at least one embodiment. At 202, the gesture-controlled private messaging program 150 initiates a virtual conference between three or more participants. The gesture-controlled private messaging program 150 may utilize known connection techniques in order to initiate, or generate, a virtual conferencing session between three or more individuals. The virtual conference may utilize any conferencing software application capable of creating a conferencing channel with video and/or audio capabilities and establishing one or more private communication channels between subsets of the entire group of participants. In at least one embodiment, the virtual conference may support audio with statis avatars if a video connection is not possible.

Then, at 204, the gesture-controlled private messaging program 150 identifies a gesture by an initiating participant in the virtual conference showing an intention for private communication. The gesture-controlled private messaging program 150 may utilize gesture detection or recognition techniques and/or gaze detection to identify one participant's desire to initiate a private communication channel with another participant. The identification of a participant's desire to initiate a private communication channel with another participant may be identified through one or more sensors of IoT sensor set 125. As previously described, IoT sensor set 125 may include, but is not limited to, headsets, cameras, wearable sensors, microphones, biometric devices, and haptic/touch feedback devices. The gesture to initiate a private communication channel may be any preconfigured bodily movement that indicates one participant wishes to begin a private communication channel with at least one other participant including, but not limited to, a hand-over-mouth gesture, an initiating participant pointing to a recipient participant's position on screen, an initiating participant nod to the side while maintaining a gaze position on the recipient participant, the initiating participant dragging gaze from the camera to the recipient participant, and the initiating participant leaning a head position in at the recipient's position on screen. For example, during a specific speech segment of the virtual conference, the gesture-controlled private messaging program 150 may, through a captured camera feed, determine a participant is performing a hand-over-mouth, whisper gesture indicating that participant's desire to begin a private communication with another participant.

Next, at 206, the gesture-controlled private messaging program 150 identifies a recipient participant of the identified gesture. Once the gesture-controlled private messaging program 150 determines that a participant in the virtual conference wishes to initiate a private communication channel with another participant in the virtual conference, the gesture-controlled private messaging program 150 may identify which participant(s) the initiating participant wishes to engage in private communication. The gesture-controlled private messaging program 150 may utilize various gestures to identify the recipient participant including, but not limited to, the initiating participant pointing to a recipient participant's position on screen, drag gaze from camera to recipient, and the initiating participant leaning head in at the recipient participant's position on screen. The gesture-controlled private messaging program 150 may identify the recipient participants though gaze detection of the initiating participant. For example, the gesture-controlled private messaging program 150 may determine that the initiating participant is looking at a section of a user device display screen currently displaying a camera feed or a static avatar associated with the recipient participant with which the initiating participant wishes to commence a private communication. In one or more alternative embodiments, the gesture-controlled private messaging program 150 may provide the capability for the initiating participant to utilize one or more user interactions with the user devices (e.g., a mouse focus, mouse click, or screen tap) to indicate which participants are the recipients of a private communication invitation. In another embodiment, the gesture-controlled private messaging program 150 may utilize a combination of gaze detection and user interactions to identify the recipient participants.

Then, at 208, the gesture-controlled private messaging program 150 modifies the conference room user interface to notify the recipient user of the intention for private communication. Once the gesture-controlled private messaging program 150 identifies the intended recipients of the initiating participant's private communication request, the gesture-controlled private messaging program 150 may transmit an invitation to each recipient participant. The gesture-controlled private messaging program 150 may notify the recipient participants through one or more notification methods. In one embodiment, the gesture-controlled private messaging program 150 may notify the recipient participants through an audio cue coupled with an on-screen notification. In another embodiment, the gesture-controlled private messaging program 150 may notify the recipient participants through a visual indication of the private communication request on a camera feed, avatar, or other visual representation of the initiating participant sending the invitation. For example, the gesture-controlled private messaging program 150 may display a digital representation of a person with a hand-to-mouth gesture on the avatar of the initiating participant to show the recipient participant that the initiating participant wishes to open a private communication channel.

Upon receiving the invitation to communicate through a private communication channel, the recipient participant may respond to the invitation through one or more user interactions with user display screen (e.g., a mouse click, screen tap, or keyboard command) or through a preconfigured gesture. For example, the recipient participant may respond to the invitation by "no" head shaking response to indicate a denial of the invitation. Similarly, the preconfigured gesture may be an acceptance gesture in the form of a "yes" head nod when the recipient participant wishes to accept the private communication request.

Next, at 210, the gesture-controlled private messaging program 150 establishes a private communication channel between the initiating participant and recipient participant. Once the gesture-controlled private messaging program 150 determines that one or more recipient participants have accepted the invitation to participate in a private communication channel, the gesture-controlled private messaging program 150 may generate a private communication space and enter all invited participants to the newly created private communication space. In at least one embodiment, entrance to the private communication space may be initiated when a recipient participant accepts the invitation. However, in another embodiment, the gesture-controlled private messaging program 150 may only create the private communication space once all recipient participants have accepted the invitation and require each recipient to manually enter the private communication space through user interactions with on-screen prompts (e.g., manually click a link to enter the private communication space).

The private communication space may be a communication channel that is separate and distinct from the public communication channel where all participants of the virtual conference interact together. The private communication channel may allow for text-based, video-based, and/or audio-based communication based on user preconfigurations. In one or more embodiments, the private communication space may be a breakout channel from the original communication space insomuch as, once the private communication space is generated and the initiating and recipient participants enter the private communication space, each is removed from the original communication space. In at least one embodiment, the gesture-controlled private messaging program 150 may return each participant in the private communication space back to the original communication space when an individual participant exits the private communication space through one or more user interactions with a user display screen or peripheral device or gestures captured by a sensor within IoT sensor set 125.

Figure 3:
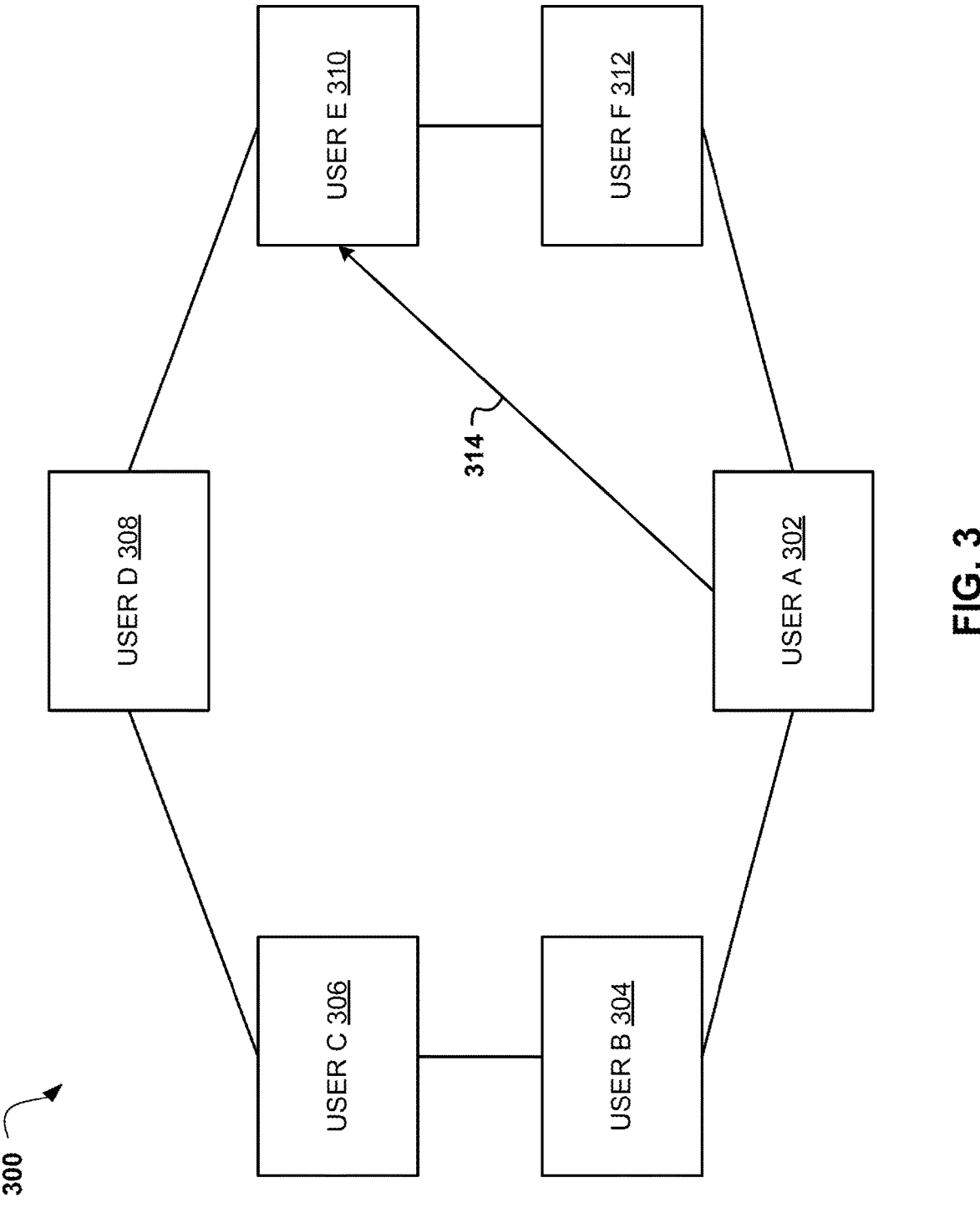
FIG. 3 depicts a block diagram of a virtual meeting according to at least one embodiment.

Referring now to FIG. 3, a block diagram of a virtual meeting is depicted according to at least one embodiment. During the occurrence of a virtual meeting 300 between six participants (i.e., Users A-F 302-312), one user may wish to initiate a private communication channel with another user. For example, User A 302 may wish to speak with User E 310 privately without communications being transmitted to the other users (i.e., Users B-D 304-308 and User F 312). In order to indicate intention to begin a private communication channel, User A 302 may perform a preconfigured gesture

314 while gazing at a section of the user device display screen depicting a video feed of User E 310 or an avatar representing User E 310.

Figure 4:
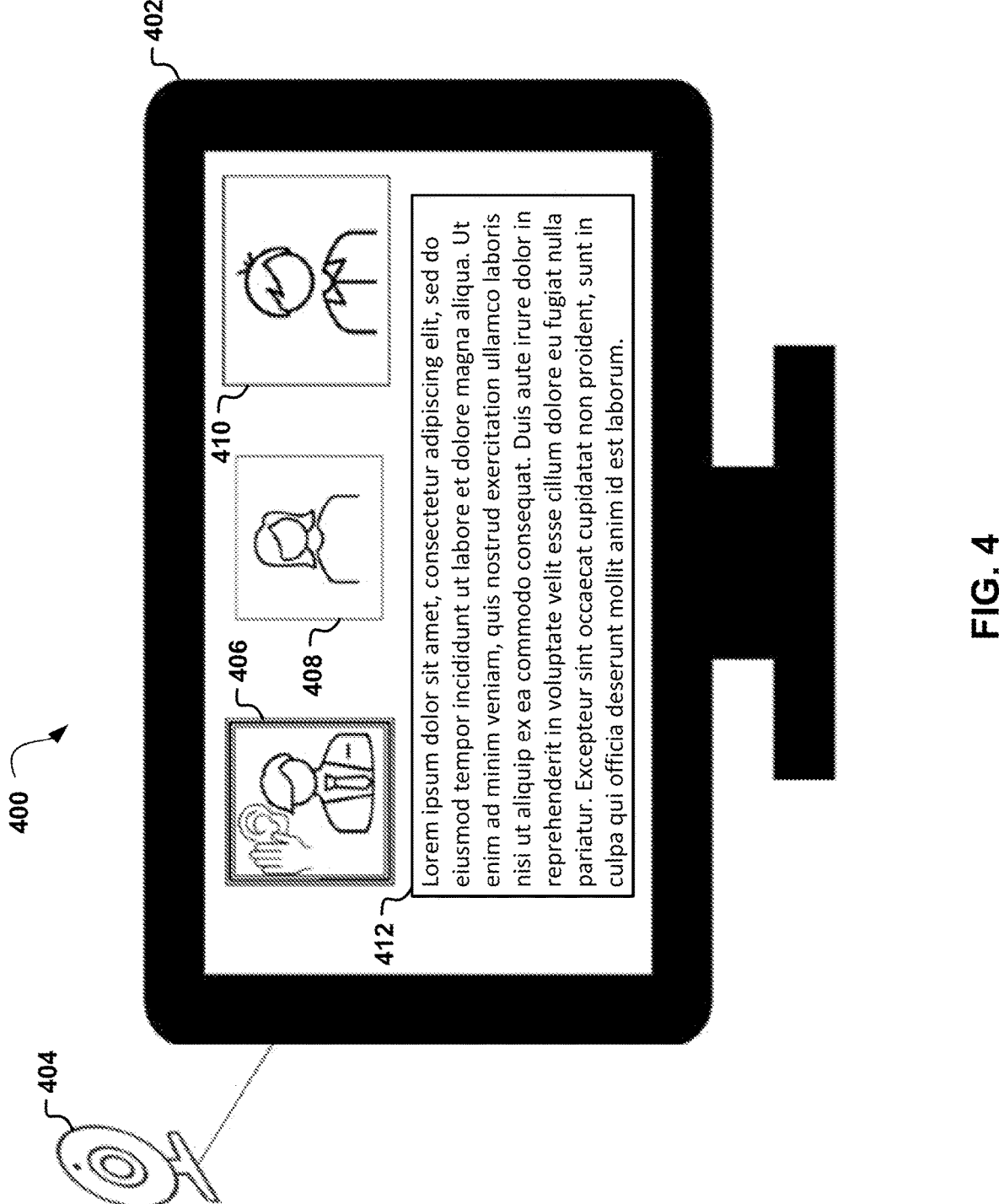
FIG. 4 depicts a block diagram of a private communication recipient user interface according to at least one embodiment.

Referring now to FIG. 4, a block diagram of a private communication recipient user interface 400 is depicted according to at least one embodiment. During a virtual conference between four participants, one participant may utilize a display screen 402 with a communicatively coupled camera 404 to view the video feeds 406-410 of each other participant in the web conference and conduct a chat session 412 viewable by each participant. Once the intention for one user to privately communicate with another user is determined by the gesture-controlled private messaging program 150, the gesture-controlled private messaging program 150 may display a notification on a video feed of the initiating participant on the display screen 402 of the recipient participant. Continuing the above example where User A 302 wishes to initiate a private communication channel with User E 310, a notification icon depicting a hand next to an ear may be displayed or overlayed on a video feed window 406 associated with User A 302. Other conference participants may not have such icons depicted on their video feed windows 408 and 410. In at least one embodiment, the gesture-controlled private messaging program 150 may depict an icon on the video feed window for each participant being invited to the private communication channel and the icon may be visible to each invited participant but not visible to participants not invited to the private communication channel.

It may be appreciated that FIGS. 2-4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:

establishing a virtual conference room and connections thereto by at least an initiating participant, a recipient participant, and a non-recipient participant;

detecting a gesture by the initiating participant toward the recipient participant indicating an intention for a private communication channel;

modifying a user interface of the virtual conference room, of the initiating participant and the recipient participant, to display an on-screen notification and an audio cue of the intention;

identifying an acceptance gesture from the recipient participant to initiate the private communication channel; and generating the private communication channel only after the identifying, wherein the generating comprises:

generating an on-screen prompt to the recipient participant that requires the recipient participant to manually enter the private communication channel.

2. The method of claim 1, wherein determining the recipient participant is based on the gesture.

3. The method of claim 1, wherein the gesture comprises the initiating participant covering their mouth with their hand.

4. The method of claim 1, further comprising:

detecting a gaze of the initiating participant contemporaneously with the gesture, and wherein determining the recipient is based on the gaze.

5. The method of claim 1, further comprising:

determining that a speaking participant is directing a speech segment to an addressee participant based on detecting a gaze of the speaking participant to the addressee participant.

6. The method of claim 1, wherein the on-screen notification displayed on the user interface of the recipient participant is an icon overlayed on a static avatar or on a video feed of the initiating participant.

7. A computer system comprising:

a processor set;

one or more computer-readable storage media; and program instructions stored on the one or more computer-readable storage media to cause the processor set to perform operations comprising:

establishing a virtual conference room and connections thereto by at least an initiating participant, a recipient participant, and a non-recipient participant;

detecting a gesture by the initiating participant toward the recipient participant indicating an intention for a private communication channel;

modifying a user interface of the virtual conference room, of the initiating participant and the recipient participant, to display an on-screen notification and an audio cue of the intention;

identifying an acceptance gesture from the recipient participant to initiate the private communication channel; and generating the private communication channel only after the identifying, wherein the generating comprises:

generating an on-screen prompt to the recipient participant that requires the recipient participant to manually enter the private communication channel.

8. The computer system of claim 7, wherein determining the recipient participant is based on the gesture.

9. The computer system of claim 7, wherein the gesture comprises the initiating participant covering their mouth with their hand.

10. The computer system of claim 7, further comprising:

detecting a gaze of the initiating participant contemporaneously with the gesture, and wherein determining the recipient is based on the gaze.

11. The computer system of claim 7, further comprising:

determining that a speaking participant is directing a speech segment to an addressee participant based on detecting a gaze of the speaking participant to the addressee participant.

12. The computer system of claim 7, wherein the on-screen notification displayed on the user interface of the recipient participant is an icon overlayed on a static avatar or on a video feed of the initiating participant.

13. A computer program product comprising:

one or more computer-readable storage media; and program instructions stored on the one or more computer-readable storage media to perform operations comprising:

establishing a virtual conference room and connections thereto by at least an initiating participant, a recipient participant, and a non-recipient participant;

detecting a gesture by the initiating participant toward the recipient participant indicating an intention for a private communication channel;

modifying a user interface of the virtual conference room, of the initiating participant and the recipient participant, to display an on-screen notification and an audio cue of the intention;

identifying an acceptance gesture from the recipient participant to initiate the private communication channel; and generating the private communication channel only after the identifying, wherein the generating comprises:

generating an on-screen prompt to the recipient participant that requires the recipient participant to manually enter the private communication channel.

14. The computer program product of claim 13, wherein determining the recipient participant is based on the gesture.

15. The computer program product of claim 13, wherein the gesture comprises the initiating participant covering their mouth with their hand.

16. The computer program product of claim 13, further comprising:

detecting a gaze of the initiating participant contemporaneously with the gesture, and wherein determining the recipient is based on the gaze.

17. The computer program product of claim 13, further comprising:

determining that a speaking participant is directing a speech segment to an addressee participant based on detecting a gaze of the speaking participant to the addressee participant.

* * * * *